(12) United States Patent
Lin

(10) Patent No.: US 9,760,773 B1
(45) Date of Patent: Sep. 12, 2017

(54) SMART CARD WITH A RETINA IDENTIFYING MODULE

(71) Applicant: Wu-Hsu Lin, Taichung (TW)

(72) Inventor: Wu-Hsu Lin, Taichung (TW)

( * ) Notice: Subject to any disclaimer, the term of this patent is extended or adjusted under 35 U.S.C. 154(b) by 0 days.

(21) Appl. No.: 15/169,823

(22) Filed: Jun. 1, 2016

(51) Int. Cl.
*G06K 9/00* (2006.01)

(52) U.S. Cl.
CPC ..... *G06K 9/00604* (2013.01); *G06K 9/00617* (2013.01)

(58) Field of Classification Search
CPC .......... G06K 9/00604; G06K 9/00617; G06Q 20/105; G06Q 20/34; G06Q 20/341; G07F 7/1008; H04L 9/3234; H04L 63/0853; H04L 9/3231
USPC ................................ 382/115–124
See application file for complete search history.

(56) References Cited

U.S. PATENT DOCUMENTS

| | | | | |
|---|---|---|---|---|
| 5,734,154 A * | 3/1998 | Jachimowicz | ... | G06K 19/07703 235/454 |
| 6,219,439 B1 * | 4/2001 | Burger | ... | G06F 21/32 235/380 |
| 6,293,470 B1 * | 9/2001 | Asplund | ... | G06K 19/07703 235/487 |
| 2012/0286936 A1 * | 11/2012 | Mullen | ... | G06Q 10/00 340/10.2 |
| 2013/0218601 A1 * | 8/2013 | Webb | ... | G06Q 20/3552 705/3 |

* cited by examiner

*Primary Examiner* — Daniel Mariam
(74) *Attorney, Agent, or Firm* — Alan D. Kamrath; Kamrath IP Lawfirm, P.A.

(57) ABSTRACT

A smart card has a bottom layer, a circuit board, a microprocessor, a retina identifying module, an operation unit, and a top layer. The microprocessor is mounted on the circuit board. The operation unit is mounted on the circuit board and is electrically connected with the microprocessor. The retina identifying module is mounted on the circuit board, is electrically connected with the microprocessor, and has a retina identifying chip and an encapsulation. The retina identifying chip is mounted on the circuit board and is electrically connected with the microprocessor. The encapsulation body is transparent, is mounted on and encloses the retina identifying chip, and has a convex top face. The top layer is mounted on the circuit board to cover the microprocessor, the operation unit and the retina identifying module.

11 Claims, 5 Drawing Sheets

SMART CARD WITH A RETINA IDENTIFYING MODULE

BACKGROUND OF THE INVENTION

1. Field of the Invention

The present invention relates to a smart card, and more particularly to a smart card having a retina identifying module.

2. Description of Related Art

A smart card, such as a credit card or a reloadable fare card has a safety chip to store data. To improve the safety of using the smart card, an identifying device, such as a fingerprint identifying device, is mounted on the smart card. In the conventional identifying devices, a retina identifying device is a preferred one because the retina identifying device is hard to be reproduced. With reference to FIG. 5, a conventional retina identify device comprises a retina identifying chip 70 and a camera shot 80. The retina identifying chip 70 is mounted on a circuit board. The camera shot 80 is mounted on a top of the retina identifying chip 70 to project the retina image of a person to the retina identifying chip 70. Accordingly, the retina identifying chip 70 can identify a person being an authorized one or not.

However, with the camera shot 80 mounted on the top of the retina identifying chip 70, the conventional retina identifying device has a large thickness. Therefore, the conventional retina identifying device cannot be applied on a smart card, so the conventional retina identifying device is not versatile in use.

To overcome the shortcomings, the present invention tends to provide a retina identifying module to mitigate or obviate the aforementioned problems.

SUMMARY OF THE INVENTION

The main objective of the invention is to provide a smart card with a retina identifying module to improve the safety of using the smart card.

The smart card has a bottom layer, a circuit board, a microprocessor, a retina identifying module, an operation unit, and a top layer. The circuit board is mounted on a top surface of the bottom layer. The microprocessor is mounted on the circuit board. The operation unit is mounted on the circuit board and is electrically connected with the microprocessor. The retina identifying module is mounted on the circuit board, is electrically connected with the microprocessor, and has a retina identifying chip and an encapsulation body. The retina identifying chip is mounted on the circuit board and is electrically connected with the microprocessor. The encapsulation body is transparent, is mounted on and encloses the retina identifying chip, and has a convex top face. The top layer is mounted on the circuit board to cover the microprocessor, the operation unit and the retina identifying module.

Other objects, advantages and novel features of the invention will become more apparent from the following detailed description when taken in conjunction with the accompanying drawings.

DETAILED DESCRIPTION OF PREFERRED EMBODIMENT

Figure 1:
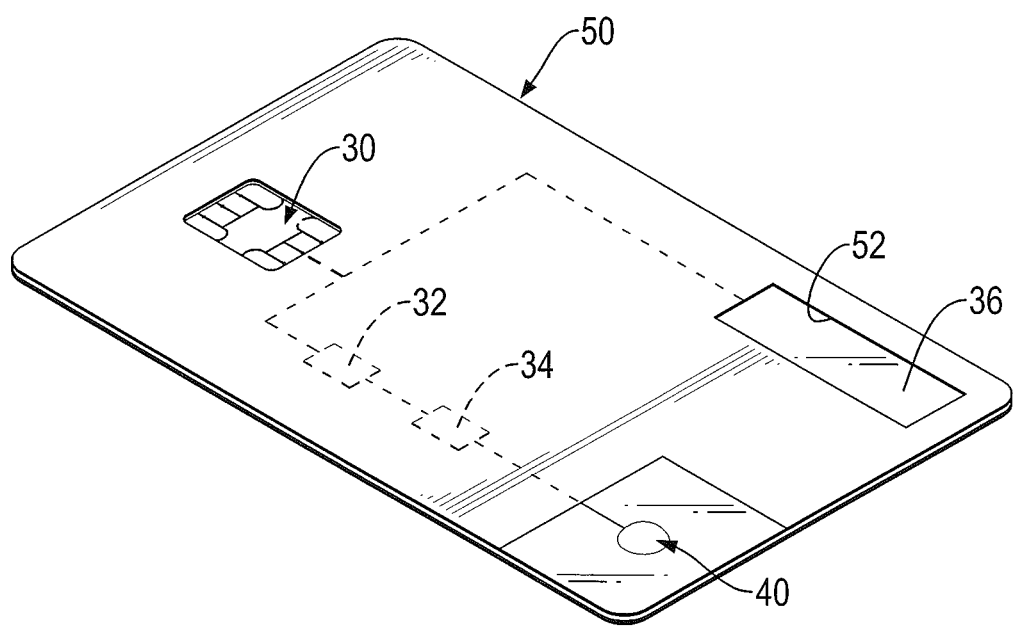
FIG. 1 is a perspective view of a first embodiment of a smart card in accordance with the present invention.
Figure 2:
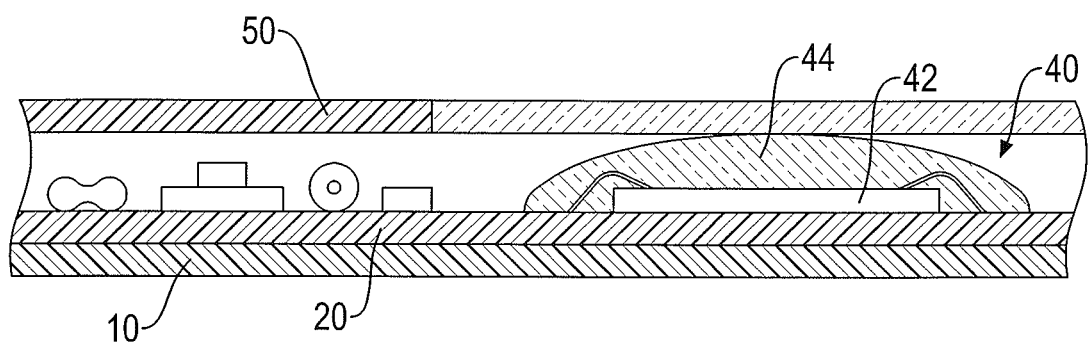
FIG. 2 is an enlarged side view in partial section of the smart card in FIG. 1.

With reference to FIGS. 1 and 2, a smart card in accordance with the present invention comprises a bottom layer 10, a circuit board 20, a microprocessor 34, an operation unit, a retina identifying module 40, and a top layer 50.

The circuit board 20 may be a soft circuit board and is mounted on a top surface of the bottom layer 10. The microprocessor 34 is mounted on the circuit board 20. The operation unit is mounted on the circuit board 20 and is electrically connected with the microprocessor 34. The operation unit may comprise a safety chip 30 and a controller 32. The safety chip 30 is mounted on the circuit board 20. The controller 32 is mounted on the circuit board 20 and is electrically connected with the safety chip 30 and the microprocessor 34.

The retina identifying module 40 is mounted on the circuit board 20, is electrically connected with the microprocessor 34, and comprises a retina identifying chip 42 and an encapsulation body 44. The retina identifying chip 42 is mounted on the circuit board 20 and is electrically connected with the microprocessor 34. The encapsulation body 44 is transparent, is mounted on and encloses the retina identifying chip 42, and has a convex top face. The top layer 50 is mounted on the circuit board 20 to cover the microprocessor 34, the operation unit and the retina identifying module 40. In the first embodiment, the top layer 50 has a transparent segment formed on the top layer 50 at a position corresponding to the retina identifying module 40. In addition, the operation unit may further comprise a display 36 mounted on the circuit board 20 and electrically connected with the safety chip 30. The top layer 50 may have a display window 52 formed through the top layer 50 at a position corresponding to the display 36 to expose the display 36 from the display window 52. In an alternative embodiment, the operation unit may only comprise a display 36 without the safety chip 30 and the controller 32.

With such an arrangement, the convex top face of the encapsulation body 44 can serve as a lens. Consequently, when a person poses one eye close to the convex top face of the encapsulation body 44, the image of retina can be projected to the retina identifying chip 42 via the convex top face of the encapsulation body 44. The retina identifying chip 42 will then transmit the image to the microprocessor 34, the controller 32, and the safety chip 30 to identify the person. The display 36 can show the information of the user thereon.

Accordingly, a camera shot is unnecessary, and the thickness of the retina identifying module can be effectively reduced. Thus, the retina identifying module 40 can be applied to a smart card, so the safety of using the smart card is improved.

Figure 3:
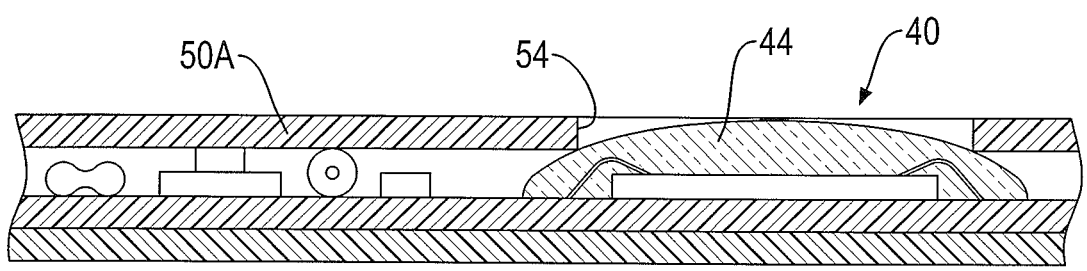
FIG. 3 is an enlarged side view in partial section of a second embodiment of a smart card in accordance with the present invention.

With reference to FIG. 3, in a second embodiment, the top layer 50A has an identifying window 54 formed through the top layer 50A at a position corresponding to the retina identifying module 40 to expose the retina identifying module 40 from the identifying window 54. Accordingly, the thickness of the smart card can be further reduced.

Figure 4:
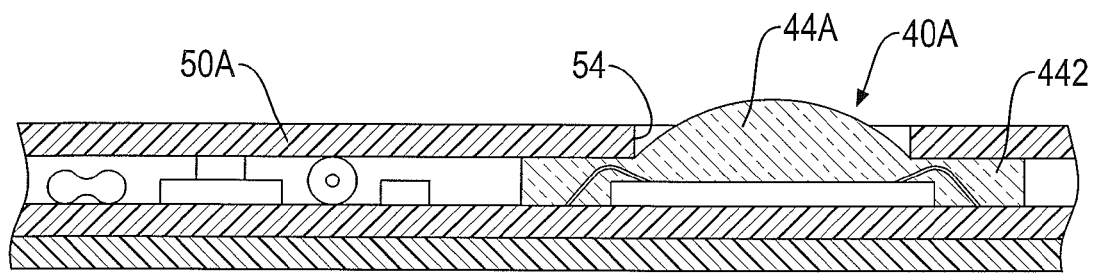
FIG. 4 is an enlarged side view in partial section of a third embodiment of a smart card in accordance with the present invention.
Figure 5:
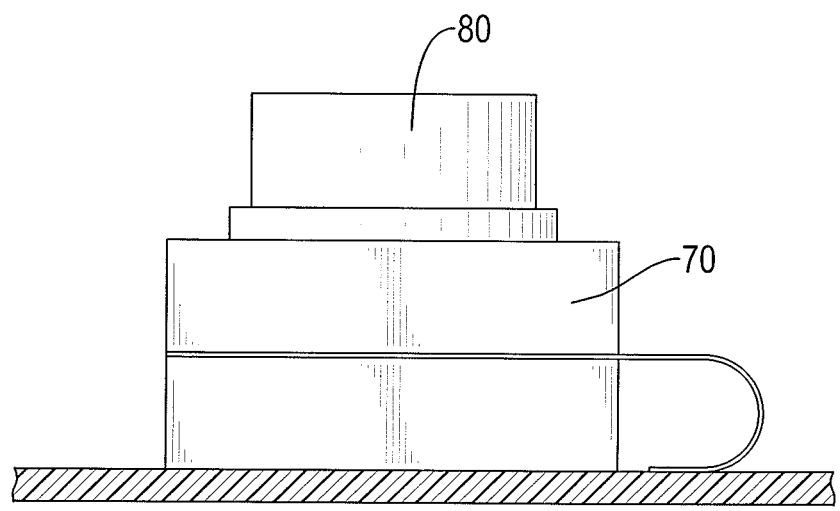
FIG. 5 is an enlarged side view in partial section of a conventional retina identifying device.

With reference to FIG. 4, in a third embodiment, the encapsulation body 44A further has a foundation segment 442 having a flat top, and the convex top face is formed on the flat top of the foundation segment 442. Accordingly, the bottom surface of the top layer 50A can abut the flat top of the foundation segment 442, and the convex top face is held in and exposed from the identifying window 54.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A smart card comprising:
   a bottom layer having a top surface;
   a circuit board mounted on the top surface of the bottom layer;
   a microprocessor mounted on the circuit board;
   an operation unit mounted on the circuit board and electrically connected with the microprocessor;
   a retina identifying module mounted on the circuit board, electrically connected with the microprocessor, and comprising
      a retina identifying chip mounted on the circuit board and electrically connected with the microprocessor; and
      an encapsulation body being transparent, mounted on and enclosing the retina identifying chip, and having a convex top face; and
   a top layer mounted on the circuit board to cover the microprocessor, the operation unit and the retina identifying module.

2. The smart card as claimed in claim 1, wherein the top layer has a transparent segment formed on the top layer at a position corresponding to the retina identifying module.

3. The smart card as claimed in claim 2, wherein the operation unit comprises
   a safety chip mounted on the circuit board; and
   a controller mounted on the circuit board and electrically connected with the safety chip and the microprocessor.

4. The smart card as claimed in claim 3, wherein the operation unit further comprises a display mounted on the circuit board and electrically connected with the safety chip; and
   the top layer has a display window formed through the top layer at a position corresponding to the display to expose the display from the display window.

5. The smart card as claimed in claim 2, wherein the operation unit comprises a display mounted on the circuit board and electrically connected with the safety chip; and
   the top layer has a display window formed through the top layer at a position corresponding to the display to expose the display from the display window.

6. The smart card as claimed in claim 1, wherein the top layer has an identifying window formed through the top layer at a position corresponding to the retina identifying module to expose the retina identifying module from the identifying window.

7. The smart card as claimed in claim 6, wherein the operation unit comprises
   a safety chip mounted on the circuit board; and
   a controller mounted on the circuit board and electrically connected with the safety chip and the microprocessor.

8. The smart card as claimed in claim 7, wherein the operation unit further comprises a display mounted on the circuit board and electrically connected with the safety chip; and
   the top layer has a display window formed through the top layer at a position corresponding to the display to expose the display from the display window.

9. The smart card as claimed in claim 1, wherein the operation unit comprises
   a safety chip mounted on the circuit board; and
   a controller mounted on the circuit board and electrically connected with the safety chip and the microprocessor.

10. The smart card as claimed in claim 9, wherein the operation unit further comprises a display mounted on the circuit board and electrically connected with the safety chip; and
    the top layer has a display window formed through the top layer at a position corresponding to the display to expose the display from the display window.

11. The smart card as claimed in claim 1, wherein the operation unit comprises a display mounted on the circuit board and electrically connected with the safety chip; and
    the top layer has a display window formed through the top layer at a position corresponding to the display to expose the display from the display window.

* * * * *